US008389458B2

(12) United States Patent
Tsumori et al.

(10) Patent No.: US 8,389,458 B2
(45) Date of Patent: Mar. 5, 2013

(54) AUTOMATIC DISHWASHING COMPOSITION CONTAINING A SULFONATED COPOLYMER

(75) Inventors: Takahiro Tsumori, Hyogo (JP); Masato Nakano, Hyogo (JP)

(73) Assignee: The Procter & Gamble Company, Cincinnat, OH (US)

( * ) Notice: Subject to any disclaimer, the term of this patent is extended or adjusted under 35 U.S.C. 154(b) by 0 days.

(21) Appl. No.: 12/863,844

(22) PCT Filed: Mar. 27, 2009

(86) PCT No.: PCT/JP2009/057002
§ 371 (c)(1),
(2), (4) Date: Jul. 21, 2010

(87) PCT Pub. No.: WO2009/123322
PCT Pub. Date: Oct. 8, 2009

(65) Prior Publication Data
US 2011/0009303 A1    Jan. 13, 2011

(30) Foreign Application Priority Data
Mar. 31, 2008    (JP) .................. 2008-091377

(51) Int. Cl.
C11D 3/37    (2006.01)
C11D 3/33    (2006.01)
(52) U.S. Cl. ........ 510/228; 510/220; 510/223; 510/229; 510/230; 510/480; 510/484; 510/493; 510/495
(58) Field of Classification Search .................. 510/220, 510/223, 228, 229, 230, 480, 484, 493, 495
See application file for complete search history.

(56) References Cited

U.S. PATENT DOCUMENTS

| | | | |
|---|---|---|---|
| 4,640,793 A | 2/1987 | Persinski et al. | |
| 4,678,596 A | 7/1987 | Dupre et al. | |
| 4,774,303 A | 9/1988 | Denzinger et al. | |
| 4,801,388 A * | 1/1989 | Fong et al. | 210/701 |
| 4,862,930 A | 9/1989 | Sauerbruch | |
| 5,064,563 A | 11/1991 | Yamaguchi et al. | |
| 5,076,957 A | 12/1991 | Diehl et al. | |
| 5,175,361 A * | 12/1992 | Denzinger et al. | 562/590 |
| 5,223,590 A | 6/1993 | Hughes et al. | |
| 5,723,427 A | 3/1998 | Scherr et al. | |
| 5,733,857 A | 3/1998 | Yamaguchi et al. | |
| 5,783,540 A | 7/1998 | Secemski et al. | |
| 5,866,664 A * | 2/1999 | McCallum et al. | 526/233 |
| 5,993,666 A * | 11/1999 | Yamaguchi et al. | 210/698 |
| 5,998,346 A | 12/1999 | Welch et al. | |
| 6,037,431 A | 3/2000 | Shioji et al. | |
| 6,060,443 A | 5/2000 | Cripe et al. | |
| 6,114,294 A | 9/2000 | Gauthier et al. | |
| 6,159,922 A | 12/2000 | Williams | |
| 6,166,149 A * | 12/2000 | Yamaguchi et al. | 525/404 |
| 6,207,780 B1 * | 3/2001 | Stockhausen et al. | 526/287 |
| 6,210,600 B1 | 4/2001 | Zhou et al. | |
| 6,239,091 B1 | 5/2001 | Tartakousky et al. | |
| 6,489,287 B1 | 12/2002 | Gauthier et al. | |
| 6,630,440 B1 | 10/2003 | Song et al. | |
| 6,903,058 B2 | 6/2005 | Nitsch et al. | |
| 6,962,898 B2 | 11/2005 | Kessler et al. | |
| 7,153,816 B2 | 12/2006 | Kessler et al. | |
| 7,192,911 B2 | 3/2007 | Sunder et al. | |
| 7,462,588 B2 | 12/2008 | Bayersdoerfer et al. | |
| 7,879,154 B2 | 2/2011 | Warkotsch et al. | |
| 2002/0198128 A1 | 12/2002 | Perkins | |
| 2003/0158078 A1 | 8/2003 | Chang | |
| 2003/0171246 A1 | 9/2003 | Boeckh et al. | |
| 2004/0116319 A1 | 6/2004 | Nitsch et al. | |
| 2005/0113271 A1 | 5/2005 | Pegelow et al. | |
| 2005/0239680 A1 | 10/2005 | Buchmeier et al. | |
| 2007/0042928 A1 | 2/2007 | Appleby et al. | |
| 2008/0188391 A1 | 8/2008 | Seebeck et al. | |
| 2010/0024846 A1 | 2/2010 | Warkotsch et al. | |
| 2010/0031976 A1 | 2/2010 | Warkotsch et al. | |
| 2010/0041575 A1 | 2/2010 | Warkotsch et al. | |
| 2010/0059703 A1 * | 3/2010 | Yang et al. | 252/76 |
| 2010/0081599 A1 | 4/2010 | Preuschen | |
| 2010/0093588 A1 | 4/2010 | Warkotsch et al. | |
| 2010/0160204 A1 | 6/2010 | Zipfel et al. | |
| 2010/0222247 A1 | 9/2010 | Zipfel et al. | |
| 2010/0249007 A1 | 9/2010 | Holderbaum et al. | |
| 2010/0249009 A1 | 9/2010 | Holderbaum et al. | |
| 2012/0015858 A1 | 1/2012 | Kessler et al. | |

FOREIGN PATENT DOCUMENTS

CA    2038332 A1    9/1991
CA    2620240 A1    3/2007
(Continued)

OTHER PUBLICATIONS

International Search Report for Appl. No. PCT/JP2009/057002 dated Jul. 22, 2009.

(Continued)

*Primary Examiner* — Charles Boyer
(74) *Attorney, Agent, or Firm* — Tiffany M. Zerby; Steven W. Miller

(57) ABSTRACT

An ADW composition comprising a builder and a water-soluble copolymer which comprises: (a) from about 30 to 60 mol % of the copolymer having a structural unit originating from a monoethylenic unsaturated dicarboxylic acid (or dicarboxylate) monomer having 4 to 6 carbon atoms or its anhydride at; (b) from about 30 to 60 mol % of the copolymer having a structural unit originating from a monoethylenic unsaturated monocarboxylic acid (or monocarboxylate) monomer having 3 to 8 carbon atoms; and (c) from about 5 to 15 mol % of the polymer having a structural unit originating from a monoethylenic unsaturated monomer having a sulfonic (or sulfonate) group; wherein the water-soluble copolymer has a weight average molecular weight of from about 1,000 to about 50,000 wherein the copolymer is polymerized with hydrogen peroxide.

6 Claims, No Drawings

FOREIGN PATENT DOCUMENTS

| | | | |
|---|---|---|---|
| CA | 2660193 | * | 2/2008 |
| CA | 2660193 | A1 | 2/2008 |
| DE | 3473739 | | 7/1989 |
| EP | 0851022 | B1 | 2/2007 |
| EP | 1754778 | A1 | 2/2007 |
| EP | 1727884 | B1 | 10/2008 |
| JP | 62-270605 | A | 11/1987 |
| JP | 63261000 | A2 | 10/1988 |
| JP | 11021586 | | 1/1990 |
| JP | 03-014046 | B2 | 2/1991 |
| JP | 10245592 | | 9/1991 |
| JP | 3278898 | | 12/1991 |
| JP | 05-239114 | A | 9/1993 |
| JP | 05-247143 | A | 9/1993 |
| JP | 03-002167 | B2 | 1/1994 |
| JP | 2574144 | B2 | 10/1996 |
| JP | 2000-355615 | A | 12/2000 |
| JP | 2000355615 | * | 12/2000 |
| WO | WO 98/16612 | | 4/1998 |
| WO | WO 2005/097963 | A1 | 10/2005 |
| WO | WO 2007/025944 | A1 | 3/2007 |
| WO | WO 2007/025955 | A1 | 3/2007 |
| WO | 2007/052004 | A1 | 5/2007 |
| WO | 2008/017620 | A1 | 2/2008 |
| WO | 2009/060966 | A1 | 5/2009 |

OTHER PUBLICATIONS

New water-soluble monomers—Polymer applications (1983) vol. 32, No. 10, pp. 466-475 M. Kametani.

Chemical Profile 2-Acrylamido-2-methypropanesulfonic acid—Fine chemicals (1999) vol. 28, No. 2, pp. 28-31.

* cited by examiner

AUTOMATIC DISHWASHING COMPOSITION CONTAINING A SULFONATED COPOLYMER

TECHNICAL FIELD

The present invention relates to an automatic dishwashing composition (ADW) comprising a maleic acid-based, water-soluble copolymer, containing a sulfonic (or sulfonate) group.

BACKGROUND ART

Many automatic dishwashing compositions incorporate dispersant polymers with calcium ion-capturing ability. Many acrylic acid-based polymers having carboxyl groups, maleic acid/acrylic acid-based copolymers, and the like have been conventionally known to have a calcium ion-capturing ability, clay-dispersing ability, and the like, and hence have been widely used in detergent compositions, inorganic pigment dispersants, agglomerate reagents, scale inhibitors, chelating agents, fiber treatment agents, and the like.

As a method of producing the acrylic acid-based polymer, there are disclosed JP 62-270605 A, JP 05-239114 A, and the like. In addition, as a method of producing the maleic acid/acrylic acid-based copolymer, there are disclosed various documents such as JP 05-247143 A, JP 03-2167 B, JP 03-14046 B, and JP 2574144 B, and thus improvements of the above abilities have been attempted.

However, while having high calcium ion-capturing ability, the maleic acid/acrylic acid-based copolymer hardly exerts the effect of the clay-dispersing ability, in particular, under the condition where the water hardness is high. This is because, in particular the maleic acid-based polymer deteriorates remarkably in antigelation properties (hardness resistance, that is, water-solubility of the polymer in the presence of a hardness component) when a content of a structural unit originating from a maleic acid increases. There is not so large problem in the case of soft water having low hardness such as water in Japan, but worldwide, use of the copolymer causes a big problem in regions where water has high hardness, such as United States of America and China.

In addition, the acrylic acid-based polymer exerts the clay-dispersing ability to some degree due to the absence of a structural unit originating from a maleic acid, but it is difficult to say that the acrylic acid-based polymer has sufficient calcium ion-capturing ability.

The water-soluble copolymer, compared to the maleic acid/acrylic acid-based copolymer or the acrylic acid-based polymer, exerts favorable calcium ion-capturing ability, clay-dispersing ability, and a calcium carbonate deposition-suppressing ability under high hardness. However, the water-soluble copolymer has a problem that a detergent is colored yellow when used as a powdery additive for detergent.

DISCLOSURE OF THE INVENTION

Problems to be Solved by the Invention

In view of the foregoing, there exists a need for a composition capable of exerting high calcium carbonate deposition-suppressing ability even under high water-hardness, while suppressing coloring of a powdery agent to yellow when used as a powdery detergent formulation.

Means for Solving the Problems

The present invention relates to an automatic dishwashing (ADW) detergent composition which provides a composition including a water-soluble copolymer which is polymerized with hydrogen peroxide.

The water-soluble copolymer at least includes, (a) 30 wt % to 60 wt %, a structural unit originating from a monoethylenic unsaturated dicarboxylic acid (or dicarboxylate) monomer having 4 to 6 carbon atoms or its anhydride ("monomer (a)"), (b) 30 wt % to 60 wt %, a structural unit originating from a monoethylenic unsaturated monocarboxylic acid (or monocarboxylate) monomer having 3 to 8 carbon atoms ("monomer (b)"), and (c) 5 wt % to 15 wt %, a structural unit originating from a monoethylenic unsaturated monomer having a sulfonic (or sulfonate) group ("monomer (c)"); and the water-soluble copolymer has a weight average molecular weight of 1,000 or more and 50,000 or less during polymerization.

According to still another aspect of the present invention, an ADW powder composition including the water-soluble copolymer is provided.

Effect of the Invention

According to the present invention, there can be provided a composition capable of exerting high calcium carbonate deposition-suppressing ability even under high water-hardness, while suppressing coloring of a powdery agent to yellow when used as a powdery detergent formulation.

BEST MODE FOR CARRYING OUT THE INVENTION

All percentages, parts and ratios are based upon the total weight of the compositions, unless otherwise specified. All such weights as they pertain to listed ingredients are based on the active level and, therefore, do not include solvents or by-products that may be included in commercially available materials, unless otherwise specified. The term "weight percent" may be denoted as "wt. %" herein.

All molecular weights as used herein are weight average molecular weights expressed as grams/mole, unless otherwise specified.

Herein, "comprising" means that other steps and other ingredients which do not affect the end result can be added. This term encompasses the terms "consisting of" and "consisting essentially of". The compositions and methods/processes can comprise, consist of, and consist essentially of the essential elements and limitations of the invention described herein, as well as any of the additional or optional ingredients, components, steps, or limitations described herein.

The term "polymer", as used herein, includes materials whether made by polymerization of one type of monomer or made by two (i.e., copolymers) or more types of monomers.

The term "water-soluble", as used herein, means that a substance is soluble in water in the present composition. In general, the substance should be soluble at 25° C. at a concentration of at least about 0.1% by weight of the water solvent, preferably at least about 1%, more preferably at least about 5%, even more preferably at least about 15%.

Water-Soluble Copolymer

The ADW composition includes a water-soluble copolymer as an essential component. The water-soluble copolymer comprises, (a) from about 30 to about 60 mol % of a structural unit originating from a monoethylenic unsaturated dicarboxylic acid (or dicarboxylate) monomer having 4 to 6 carbon atoms or its anhydride at, (b) from about 30 to about 60 mol % of a structural unit originating from a monoethylenic unsaturated monocarboxylic acid (or monocarboxylate) monomer having 3 to 8 carbon atoms, and (c) from about 5 to about 15 mol % of a structural unit originating from a monoethylenic unsaturated monomer having a sulfonic (or sulfonate) group.

The water-soluble copolymer has a weight average molecular weight of from about 1,000 or to about 50,000, more preferably from about 6,000 to about 15,000, and most preferably from about 8,300 to about 13,000.

Hereinafter, respective components of the water-soluble copolymer are described in detail in each item.

Examples of the monoethylenic unsaturated dicarboxylic acid (or dicarboxylate) having 4 to 6 carbon atoms as the monomer (a) include maleic acid, itaconic acid, mesaconic acid, fumaric acid, and citraconic acid and their salts, and their anhydrides if the acid can have an anhydrous form. Those may be used alone or in combination as a mixture. In addition, derivatives of those exemplified compounds can be used to such an extent that characteristics of the water-soluble copolymer are not impaired and a polymerization reaction is not inhibited. Maleic acid (or a maleate), or maleic anhydride is particularly preferred.

Examples of the monoethylenic unsaturated monocarboxylic acid (or monocarboxylate) having 3 to 8 carbon atoms as the monomer (b) include acrylic acid, methacrylic acid, crotonic acid, isocrotonic acid, and α-hydroxyacrylic acid, and salts of those acids. Those may be used alone or in combination as a mixture. In addition, derivatives of those exemplified compounds can be used to such an extent that characteristics of the water-soluble copolymer are not impaired and the polymerization reaction is not inhibited. Acrylic acid and methacrylic acid, and salts of the acids are particularly preferred.

Examples of the monoethylenic unsaturated monomer having a sulfonic (or sulfonate) group as the monomer (c) include 3-allyloxy-2-hydroxy-1-propanesulfonic acid, vinyl sulfonic acid, allyl sulfonic acid, methallyl sulfonic acid, styrene sulfonic acid, 2-acrylamide-2-methyl propanesulfonic acid, sulfoethyl acrylate, sulfoethyl methacrylate, sulfopropyl acrylate, sulfopropyl methacrylate, and 2-hydroxy-3-butenesulfonic acid, and salts thereof. Those may be used alone or in combination as a mixture. Preferred are 3-allyloxy-2-hydroxy-1-propanesulfonic acid, 2-acrylamide-2-methyl propanesulfonic acid, sulfoethyl acrylate, sulfoethyl methacrylate, 2-hydroxy-3-butenesulfonic acid, and salts thereof. Particularly preferred is 3-allyloxy-2-hydroxy-1-propanesulfonic acid and its salt, because the calcium carbonate deposition-suppressing ability of the water-soluble copolymer aqueous solution or the powder containing the water-soluble copolymer becomes high. In addition, because stability with time of a copolymer to be obtained is high, 3-allyloxy-2-hydroxy-1-propanesulfonic acid and its salt is preferred as a monoethylenic unsaturated monomer having a sulfonic (or sulfonate) group.

In addition, the term "-ate" as used in the present invention refers to, for example, a salt of an alkali metal such as sodium or potassium, a salt of an alkaline earth metal such as calcium or magnesium, an ammonium salt, or an organic amine salt such as monoethanolamine or triethanolamine. Those may be used alone or in combination as a mixture. A salt of an alkali metal such as sodium or potassium is preferred, and a sodium salt is particularly preferred. Hereinafter, those are each denoted simply as "-ate" in the present invention.

The water-soluble copolymer may include a structure originating from another monomer (referred to as "monomer (d)") in addition to the structure originating from the above monomers (a) to (c). The monomer (d) is not particularly limited and may be one of water-soluble and water-insoluble monomers as long as the monomer (d) is a monoethylenic unsaturated monomer copolymerizable with the monomers (a) to (c) and the monomer (d) does not impair water-solubility of the obtained copolymer.

A composition ratio of those monomers (a) to (d) in the copolymer is, at a molar ratio, (a)/(b)/(c)/(d)=30 to 70/30 to 70/2 to 16/0 to 5, and preferably 40 to 60/40 to 60/5 to 15/0 to 5, and the total is 100 mol %.

Automatic Dish Washing Detergent Composition

The copolymers herein are present in ADW compositions, including solid automatic dishwashing compositions, liquid automatic dishwashing compositions, and tab/unit does forms of automatic dishwashing compositions.

ADW compositions may comprise low foaming nonionic surfactants (LFNIs). LFNI can be present in amounts from about 0.25% to about 4%. LFNIs are most typically used in automatic detergents on account of the improved water-sheeting action (especially from glass) which they confer to the gel automatic detergents. Preferred LFNIs include nonionic alkoxylated surfactants, especially ethoxylates derived from primary alcohols, and blends thereof with more sophisticated surfactants, such as polyoxypropylene/polyoxyethylene/polyoxypropylene reverse block polymers. The PO/EO/PO polymer-type surfactants are well-known to have foam suppressing or defoaming action, especially in relation to common food soil ingredients such as egg. In a preferred embodiment, the LFNI is an ethoxylated surfactant derived from the reaction of a monohydroxy alcohol or alkylphenol containing from about 8 to about 20 carbon atoms, excluding cyclic carbon atoms, with from about 6 to about 15 moles of ethylene oxide per mole of alcohol or alkyl phenol on an average basis. A particularly preferred LFNI is derived from a straight chain fatty alcohol containing from about 16 to about 20 carbon atoms (C-16 to C-20 alcohol), preferably a C-18 alcohol, condensed with an average of from about 6 to about 15 moles, preferably from about 7 to about 12 moles, and most preferably from about 7 to about 9 moles of ethylene oxide per mole of alcohol. Preferably the ethoxylated nonionic surfactant so derived has a narrow ethoxylate distribution relative to the average.

The LFNI can optionally contain propylene oxide in an amount up to about 15% by weight. Certain of the block polymer surfactant compounds designated PLURONIC® and TETRONIC® by the BASF-Wyandotte Corp., Wyandotte, Mich., are suitable in gel automatic detergents of the invention. LFNIs which may also be used include a C-18 alcohol polyethoxylate, having a degree of ethoxylation of about 8, commercially available as "SLF-18 Poly-tergent" from BASF Corp.

ADW compositions may additionally contain a dispersant polymer typically in the range from 0 to about 30%, preferably from about 0.5% to about 20%, more preferably from about 1% to about 10% by weight of the ADW compositions. The dispersant polymer may be ethoxylated cationic diamines or ethoxylated cationic polyamines described in U.S. Pat. No. 4,659,802. Other suitable dispersant polymers include co-polymers synthesized from acrylic acid, maleic acid and methacrylic acid such as ACUSOL® 480N and ACUSOL 588® supplied by Rohm & Haas and an acrylic-maleic (ratio 80/20) phosphono end group dispersant copolymers sold under the tradename of Acusol 425N® available from Rohm &Haas. Polymers containing both carboxylate and sulphonate monomers, such as ALCOSPERSE® polymers (supplied by Alco) are also acceptable dispersant polymers. In one embodiment an ALCOSPERSE® polymer sold under the trade name ALCOSPERSE® 725, is a co-polymer of Styrene and Acrylic Acid with the following structure:

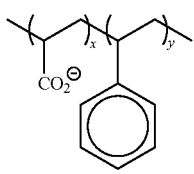

x:y = 60:40, or 50:50, MW = 8000.

ALCOSPERSE® 725 may also provide a metal corrosion inhibition benefit.

Other dispersant polymers are low molecular weight modified polyacrylate copolymers including the low molecular weight copolymers of unsaturated aliphatic carboxylic acids disclosed in U.S. Pat. Nos. 4,530,766, and 5,084,535 and European Patent Application No. 66,915, published Dec. 15, 1982.

Dishwashing compositions may utilize detergent builders to assist in controlling mineral hardness and dispersancy. Inorganic as well as organic builders can be used. Embodiment of such dish washing product can be selected from the group consisting of phosphate, phosphate oligomers or polymers and salts thereof, silicate oligomers or polymers and salts thereof, aluminosilicates, magnesioaluminosiliates, citrate, methyl glycine diacetic acid and/or salts thereof, glutamatic diacetic acid and/or salts thereof and mixtures thereof. Phosphate detergent builders include, but are not limited to, the alkali metal, ammonium and alkanolammonium salts of polyphosphates. Silicate builders herein are any silicates which are soluble to the extent that they do not adversely affect spotting/filming characteristics of the gel detergent composition. Aluminosilicate builders can be used in the present compositions though are not preferred for automatic dishwashing detergents. Carbonate builders include alkaline earth and alkali metal carbonates as disclosed in German Patent Application No. 2,321,001 published on Nov. 15, 1973. Various grades and types of sodium carbonate and sodium sesquicarbonate can be used, certain of which are particularly useful as carriers for other ingredients, especially detersive surfactants. Organic detergent builders include a wide variety of polycarboxylate compounds. Other useful builders include the ether hydroxypolycarboxylates, copolymers of maleic anhydride with ethylene or vinyl methyl ether, 1,3,5-trihydroxy benzene-2,4,6-trisulphonic acid, and carboxymethyloxysuccinic acid, the various I alkali metal, ammonium and substituted ammonium salts of polyacetic acids such as ethylenediaminetetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof. Citrate builders, e.g., citric acid and soluble salts thereof (particularly sodium salt), are polycarboxylate builders of particular importance for heavy duty laundry detergent and automatic dishwashing formulations due to their availability from renewable resources and their biodegradability. Methyl glycine diacetic acid and/or salts thereof (MGDA) may also be utilized as builders in the present composition. A preferred MGDA compound is a salt of methyl glycine iacetic acid. Suitable salts include the diammonium 1.0 slt, the dipotassium salt and, preferably, the disodium salt. Glutamatic diacetic acid and/or salts thereof (GLDA) may also be utilized as builders in the present compositions. A preferred GLDA compound is a salt of glutamic diacetic acid. Suitable salts include the diammonium salt, the dipotassium salt and, preferably, the disodium salt. 1-hydroxyethylidene-1,1-diphosphonic acid (HEDP) may also be utilized as a builder in the present compositions.

Preferably, the builder herein does not contain phosphate. More preferably, the builder is a biodegradable builder, such as GLDA or MGDA or a combination thereof.

Perfume may be added to the compositions. The detergent compositions can contain agents that are effective as corrosion inhibitors and/or anti-tarnish aids.

"Detergent enzyme", as used herein, means any enzyme having a cleaning, stain removing or otherwise beneficial effect in a gel detergent composition. Preferred enzymes are hydrolases such as proteases, amylases and lipases. Highly preferred for automatic dishwashing are amylases and/or proteases, including both current commercially available types and improved types. Enzyme-containing compositions herein can comprise from about 0.001% to about 10%, preferably from about 0.005% to about 8%, most preferably from about 0.01% to about 6%, by weight of an enzyme.

The compositions herein can also optionally contain one or more transition-metal selective sequestrants, "chelants" or "chelating agents", e.g., iron and/or copper and/or manganese chelating agents. Chelating agents suitable for use herein can be selected from the group consisting of aminocarboxylates, phosphonates (especially the aminophosphonates), polyfunctionally-substituted aromatic chelating agents, and mixtures thereof. Commercial chelating agents for use herein include the BEQUEST series, and chelants from Monsanto, DuPont, and Nalco, Inc.

The detergent composition can be preferably low foaming, readily soluble in the washing medium and most effective at pH values best conducive to improved cleaning performance, such as in a range of desirably from about pH 6.5 to about pH 12.5, and preferably from about pH 7.0 to about pH 12.0, more preferably from about pH 8.0 to about pH 12.0. The pH adjusting components are desirably selected from sodium or potassium hydroxide, sodium or potassium carbonate or sesquicarbonate, sodium or potassium silicate, boric acid, sodium or potassium bicarbonate, sodium or potassium borate, and mixtures thereof.

One embodiment relates to a gel ADW composition comprising water, a thickener, builder or chelants and optionally an organic solvent selected from the group consisting of low molecular weight aliphatic or aromatic alcohols, low molecular weight alkylene glycols, low molecular weight alkylene glycol ethers, low molecular weight esters, low molecular weight alkylene amines, low molecular weight alkanolamines, and mixtures thereof.

Any adjunct ingredient in any amount may be used in the gel detergent composition. For example, adjunct ingredients may be selected from the group consisting of nanoparticles, functionalized surface molecules, polymers, surfactants, co-surfactants, metal ions, proteins, dyes, acids, optical brighteners, colorants, filler salts, hydrotropes, preservatives, antioxidants, germicides, fungicides, color speckles, solubilizing agents, carriers and mixtures thereof.

Quite typically, cleaning compositions herein such as laundry detergents, laundry detergent additives, hard surface cleaners, synthetic and soap-based laundry bars, fabric softeners and fabric treatment liquids, solids and treatment articles of all kinds will require several adjuncts, though certain simply formulated products, such as bleach additives, may require only, for example, an oxygen bleaching agent and a surfactant as described herein. A comprehensive list of suitable laundry or cleaning adjunct materials can be found in WO 99/05242.

Common cleaning adjuncts include builders, enzymes, polymers not discussed above, bleaches, bleach activators (e.g. Aldrich) such as those disclosed in U.S. Pat. No. 5,804, 542, catalytic materials and the like excluding any materials already defined hereinabove. Other cleaning adjuncts herein can include suds boosters, suds suppressors (antifoams) and the like, diverse active ingredients or specialized materials such as dispersant polymers (e.g., from BASF Corp. or Rohm & Haas) other than those described above, color speckles, silvercare, anti-tarnish and/or anti-corrosion agents, dyes, fillers, germicides, alkalinity sources, hydrotropes, anti-oxidants, enzyme stabilizing agents, pro-perfumes, perfumes, solubilizing agents, carriers, processing aids, pigments, and, for liquid formulations, solvents, chelating agents, dye transfer inhibiting agents, dispersants, brighteners, suds suppressors, dyes, structure elasticizing agents, fabric softeners, anti-abrasion agents, hydrotropes, processing aids, and other fabric care agents, surface and skin care agents. Suitable examples of such other cleaning adjuncts and levels of use are found in U.S. Pat. Nos. 5,576,282, 6,306,812 B1 and 6,326, 348 B1.

Method of Producing Copolymer

A method of producing a water-soluble copolymer suitable for the ADW compositions herein is not particularly limited and preferably includes polymerization in an aqueous solvent in the presence of a radical polymerization initiator by using a chain transfer agent. As the radical polymerization initiator, hydrogen peroxide, a persulfate, or both of them in combination is particularly preferably used.

Hereinafter, each condition is described in detail.

Solvent

The solvent that can be used in the production method of the copolymer is may be any substance which is suitable to promote or improve the solubility of the monomers to be used during polymerization. Preferably, the solvent is water or a generally aqueous solution. However, an organic material may used as a suitable solvent to the extent that polymerization is not adversely affected.

Specific examples of the organic solvent include: lower alcohols such as methanol, ethanol, and isopropylalcohol; lower ketones such as acetone, methyl ethyl ketone, and diethyl ketone; ethers such as dimethyl ether, diethyl ether, and dioxane; and amides such as dimethylformaldehyde. Those may be used alone and may be used in combination as a mixture.

Methods of Adding Monomers

Methods of adding the monomers in the production method for the copolymer are described sequentially.

The monomer (a) is added in the amount of 50 weight % or more, preferably 80 weight % or more, and particularly preferably total amount as an initially loaded amount with respect to the total use amount of the monomer (a). It is not preferred that the initially loaded amount be less than 50 weight % because the amount of the unreacted products in the latter half of the polymerization increases and the monomer (a) in the copolymer is not introduced uniformly, resulting in deterioration of the calcium ion-capturing ability and the antigelation ability of the copolymer to be obtained. Note that neutralization degree is described later.

The monomer (b) is added to a reaction system in the amount of 70 weight % or more, preferably 90 weight % or more, and particularly preferably total amount with respect to the total use amount of the monomer (b) by substantially continuous dropping. It is not preferred that the dropping ratio be less than 70 weight % (that is, the initially loaded amount be 30 weight % or more) because block polymerization of the monomer (b) occur at the initial polymerization and the copolymer may have high molecular weight, resulting in adverse effects on the calcium ion-capturing ability, the clay-dispersing ability in water having high hardness, and the antigelation ability. The dropping time of the monomer (b) is 30 to 240 minutes, preferably 60 to 180 minutes, and particularly preferably 90 to 150 minutes. When the dropping time is shorter than 30 minutes, block polymerization of the monomer (b) occurs and when the dropping time exceed 240 minutes, block polymerization of the monomer (a) occurs. Accordingly, both cases adversely affect the calcium ion-capturing ability, the clay-dispersing ability in water having high hardness, and the antigelation ability, therefore, both cases are not preferred. Note that neutralization degree is described below.

Methods of adding the monomer (c) and the monomer (d) are not particularly limited. A ratio between the initially loaded amount of each monomer and the amount in which the monomer is dropped, and, when the monomer is dropped, the dropping time may be appropriately set in view of the reactivity of the monomer. Neutralization degree is described below.

Neutralization Degree of Monomer

The neutralization degree of the monomer is 50 to 100 mol % and preferably 50 to 95 mol % with respect to the total amount of the monomers (a) to (d) at the stage before the polymerization initiator is loaded. It is not preferred that the neutralization degree be less than 50 mol % or exceed 100 mol % because introduction efficiency of the monomer (a) impairs, resulting in deteriorations of the calcium ion-capturing ability and the antigelation ability of the copolymer to be obtained. Examples of the neutralizer for the monomer include: hydroxides of alkali metals such as sodium hydroxide and potassium hydroxide; hydroxides of alkaline earth metals such as calcium hydroxide and magnesium hydroxide; ammonia; and organic amine salts such as monoethanolamine and triethanolamine. Those may be used alone or in combination as a mixture. Hydroxides of alkali metals such as sodium hydroxide and potassium hydroxide are preferred, and sodium hydroxide is particularly preferred. Hereinafter, those are simply denoted as "neutralizer".

A neutralization degree during the polymerization (that is, during the dropping of a monomer) is not particularly limited and can be set to any appropriate neutralization degree as long as the neutralization degree is within the range for a polymerization pH to be described later. The neutralization degree may be appropriately set with a neutralizer in view of the reactivity of the monomer.

Polymerization Initiator

The polymerization initiator in the production method for the copolymer is not particularly limited. The polymerization is preferably performed by using a radical polymerization initiator. Hydrogen peroxide, a persulfate, or both of them in combination is particularly preferably used. A chain transfer agent and a polyvalent metal ion as a promoter for the decomposition of each of the initiators may be used. Hereinafter, the initiator is described specifically.

Radical Polymerization Initiator

Examples of the radical polymerization initiator include: persulfates such as ammonium persulfate, potassium persulfate, and sodium persulfate; azo-based compounds such as 2,2'-azobis(2-amidinopropane)hydrochloride, 4,4'-azobis-4-cyanovaleric acid, azobisisobutylonitrile, 2,2'-azobis(4-methoxy-2,4-dimethyl valeronitrile); organic peroxides such as benzoyl peroxide, lauroyl peroxide, peracetic acid, di-t-butylperoxide, and cumene hydroperoxide; and hydrogen peroxide. Those may be used alone or in combination as required. In addition, persulfates such as ammonium persulfate, potassium persulfate, and sodium persulfate, hydrogen peroxide, and combination of those compounds are particularly preferred. The water-soluble copolymer aqueous solution includes hydrogen peroxide as an essential component during polymerization. Accordingly, use of hydrogen peroxide as an initiator or a chain transfer agent is preferred because hydrogen peroxide contributes to simplification of production process and reduction in production cost. A combination of a persulfate and hydrogen peroxide is most preferred as a polymerization technique.

The use amount of the radical polymerization initiator is 2 g to 10 g and preferably 3 g to 8 g in total per 1 mol of a monomer. It is not preferred that the use amount be less than 2 g because the residual amount of the monomer significantly increases. In addition, it is not also preferred that the use amount exceed 10 g, from the following reasons: no addition effect of the initiator is not found any more; the use amount is economically disadvantageous; and purity content of the obtained copolymer reduces in accordance with an excess amount of the initiator, resulting in deterioration of physical properties such as the calcium ion-capturing ability.

The method of adding a radical polymerization initiator is not particularly limited. However, in view of its decomposition property, the amount in which the radical polymerization initiator is dropped substantially continuously is preferably 50 weight % or more of the required predetermined amount, particularly preferably 80 weight % or more, and most preferably total amount with respect to total use amount of the radical polymerization initiator.

The dropping time is not particularly limited and preferably set appropriately as desired because the dropping time affects on the molecular weight and the molecular weight distribution of the polymer to be obtained. The initiators, which are decomposed relatively quickly, such as persulfates, e.g., ammonium persulfate, potassium persulfate, and sodium persulfate, is preferably dropped until the time when dropping of the monomers is terminated, and the dropping of the initiator is preferably terminated in 30 minutes after the dropping of the monomers is terminated, and particularly preferably in 5 to 20 minutes after the dropping of the monomers is terminated. From the foregoing, there can be found such an effect that the residual amount of the monomers in the copolymer can be remarkably reduced. Note that even when the dropping of the initiator terminates before dropping of the monomers is terminated, the polymerization is not adversely affected. Then, the dropping time of the initiator may be set according to the residual amount of the monomers in the obtained copolymer.

The time when dropping of the initiator is initiated is not limited and may be set appropriately. For example, dropping of the initiator may be initiated before dropping of the monomers is initiated if so desired. Alternatively, in particular when two or more of initiators are used in combination, dropping of one initiator is initiated, and after a predetermined lapse of time or termination of the dropping, dropping of another initiator may be initiated. The time when dropping of the initiator is initiated may be set appropriately according to the decomposition rate of the initiator and reactivity of the monomers.

Chain Transfer Agent

A chain transfer agent may be used as a molecular weight modifier for the copolymer as required in combination with the radical polymerization initiator to such an extent that the polymerization is not adversely affected. Examples of the chain transfer agent include, but not particularly limited to, a sulfite, a bisulfite, and a hypophosphite. Those may be used alone or in combination.

The use amount of the chain transfer agent is preferably as twice or less the amount of the initiator at weight ratio. It is not preferred that the amount of the chain transfer agent exceed twice the amount of the initiator because a decrease in purity content of the copolymer is caused. In addition, a method of adding a chain transfer agent and dropping time in the case where the chain transfer agent is dropped are not particularly limited and may be set according to the formulator's preference.

Polyvalent Metal Ion

A polyvalent metal ion may be used as a promoter for the decomposition of the radical polymerization initiator as required in combination with the initiator. An effective polyvalent metal ion that can be used is, for example, $Fe^{2+}$, $Fe^{3+}$, $Cu^{2+}$, $Cu^{+}$, $V^{2+}$, $V^{3+}$, or $VO^{2+}$. Those may be used alone or in combination. Although the water-soluble copolymer aqueous solution is characterized by including hydrogen peroxide, addition of the polyvalent metal ion causes decomposition of the hydrogen peroxide. Accordingly, it is not preferred to add the polyvalent metal ion because more hydrogen peroxide has to be added in order to obtain desirable effects.

When the polyvalent metal ion is added, a method of adding the polyvalent metal ion is not particularly limited. The polyvalent ion is preferably added before dropping of the monomers is terminated and particularly preferably the total amount of the polyvalent metal ion is loaded in the initial stage. In addition, the use amount is preferably 100 ppm or less with respect to the total amount of the reaction liquid. It is not preferred that the use amount exceed 100 ppm because no addition effect is found any more and the obtained copolymer is colored considerably and hence the copolymer may not be used as a detergent composition.

When the polyvalent metal ion is added, supplying form of the polyvalent metal ion is not particularly limited and any metal compounds and metals can be used as long as they are ionized in a polymer reaction system. Examples of the metal compound and metal include: water-soluble metal salts such as vanadium oxytrichloride, vanadium trichloride, vanadium oxalate, vanadium sulfate, vanadic acid anhydride, ammonium methavanadate, ammonium hypovanadus sulfate [$(NH_4)_2SO_4 \cdot VSO_4 \cdot 6H_2O$], ammonium vanadus sulfate [$(NH_4)V(SO_4)_2 \cdot 12H_2O$], copper (II) acetate, copper (II) bromide, copper (II) acetyl acetate, cupric chloride, ammonium copper chloride, copper carbonate, copper (II) chloride, cupric (II) citrate, copper (II) formate, copper (II) hydroxide, copper nitrate, copper napthenate, copper (II) oleate, copper maleate, copper phosphate, copper (II) sulfate, cuprous chloride, copper (I) cyanide, copper iodide, copper (I) oxide, copper thiocyanate, iron acetylacetate, ammonium iron citrate, ferric ammonium oxalate, ferrous ammonium sulfate, ferric ammonium sulfate, iron citrate, iron fumarate, iron maleate, ferrous lactate, ferric nitrate, iron pentacarbonyl, ferric phosphate, ferric pyrophosphate; metal oxides such as vanadium pentoxide, copper (II) oxide, ferrous oxide, and ferric oxide; metallic sulfide such as copper (II) sulfate and iron sulfate; copper powder; and iron powder. The monomer composition for polymerization includes additives such as the above monomer, a polymerization initiator, a chain transfer agent, and a polyvalent metal ion. Note that another additive other than the exemplified additives may be included in the monomer composition to such an extent that the polymerization reaction is not inhibited and physical properties of the obtained water-soluble copolymer are not inhibited.

Other Polymerization Conditions

Other polymerization conditions in the production method for the copolymer are pH, temperature, concentration, and pressure upon the polymerization. Those conditions are described in detail sequentially.

pH Upon Polymerization

The pH upon the polymerization at the time when the initial loading is terminated (that is, immediately before the initiation of the dropping of a monomer to be added by dropping, or, when the dropping of the polymerization initiator is initiated before the dropping of the monomer, immediately before the initiation of the dropping of the polymerization initiator) is 5 to 13, preferably 5 to 12, and more preferably 8 to 12. After that, according to the initiation of the dropping of the monomer, the polymerization is initiated, and the following setting is preferably performed: the pH gradually reduces with the progress of the polymerization. The pH of the reactants is preferably adjusted to 4 to 8 at the time when the dropping of the monomers is terminated.

In general, the polymerizability of the monomer (a) is difficult as compared to that of the monomer (b). Accordingly, the monomer (a) is added in a large amount in the stage of initial loading. In that case, however, the concentration of the monomer (a) is overwhelmingly larger as compared to that of the monomer (b) in the early stage of the polymerization, so the block polymerization of the monomer (a) may occur. In view of the foregoing, in the production method herein, pH must be adjusted with a view to controlling the polymerizability of the monomer (a), so the pH is set within the above range (5 to 13). The monomer (a) is a monomer having a dicarboxylic acid, and the possible types of the monomer are classified into the following three types: a type in which both carboxyl groups are acidic, a type in which one of the groups is acidic, and a type in which both the groups are neutral. Of those, the type in which one of the groups is acidic, that is, a semi-neutral type is most rich in polymerizability, so the polymerizability of the monomer (a) can be controlled by controlling the abundance of the molecules of the monomer (a) of the semi-neutral type. That is, in the early stage of the polymerization, the amount of the molecules of the semi-neutral type must be increased because the polymerizability of the monomer (a) also reduces as the abundance of the molecules of the semi-neutral type is suppressed to some extent, and the polymerization progresses so that the concentration of the monomer (a) itself reduces. The inventors have arrived at the above setting of the pH in consideration of those findings.

Note that the "neutralizer" described in the section titled "Methods of adding monomers" has only to be appropriately used as a pH adjustor as required. Note that the final pH has only to be set to a desired pH by appropriately using the "neutralizer" after termination of the polymerization as required.

Polymerization Temperature

A temperature upon the polymerization is not particularly limited at the initial loading. The temperature is preferably 80° C. or higher, more preferably 90° C. or higher, particularly preferably near the boiling point of a polymerization solvent, and still more preferably the boiling point of the polymerization solvent during a time period from the initiation of the polymerization caused by the initiation of the dropping of the monomer or polymerization initiator to the termination of the polymerization (or to the termination of the aging when an additional time period for which the resultant copolymer is aged is set after the termination of the polymerization (termination of the dropping of all components including the monomers, the polymerization initiators)). When pH and the concentration are adjusted after termination of the polymerization, the temperature is not particularly limited and may be set appropriately.

It is not preferred that the temperature upon the polymerization be lower than 80° C. because decomposition efficiency of the polymerization initiator deteriorate and residual amount of the monomers in the copolymer to be obtained increases. In addition, polymerization at the boiling point is preferred because temperature control becomes easy and hence good reproducibility of the polymerization and stable quality of the copolymer to be obtained can be obtained.

Polymerization Concentration

The concentration of each monomer upon the polymerization of the monomer composition for polymerization reaction is not particularly limited. The concentration at the initial loading is 35 to 75 weight %, preferably 40 to 70 weight %, and particularly preferably 45 to 60 weight %. It is not preferred that the concentration of each monomer at the initial loading be less than 35 weight % in view of productivity and because reactivity of the monomer (a) deteriorates. It is not preferred that the concentration exceed 75 weight % because no water-solubility of the monomers is found any more and a slurry-like product or a precipitant is generated in the reaction liquid, resulting in non-uniform polymerization.

In addition, the solid content concentration of the polymer at the termination of polymerization is 35 to 65 weight %, preferably 40 to 60 weight %, and particularly preferably 45 to 60 weight %. The concentration of a dropping product (that is, each monomer) is adjusted so that the concentration corresponds to the above range. The solid content concentration of the polymer of less than 35 weight % at the termination of polymerization results in extreme decrease in the solid content concentration of the polymer. Thus, the concentration of the polymer of less than 35 weight % is not preferred from the viewpoint of economical efficiency because polymerizability of the monomers deteriorates and hence residual amounts of the monomers in the copolymer to be obtained increases, and productivity lowers. On the contrary, the solid content concentration of the polymer of more than 65 weight % is not preferred because the concentration results in extreme increase in the solid content concentration of the polymer, thus, the reaction solution has high viscosity, uniform polymerization cannot be obtained, the polymer may have extreme high molecular weight, and in particular, the clay dispersing ability in water having high hardness is adversely affected. Further, the solution viscosity of the copolymer to be obtained becomes high, so the concentration of the polymer of more than 65 weight % is not preferred also in view of handling. Note that the solid content concentration of the polymer after the polymerization may be adjusted appropriately.

Polymerization Pressure

The pressure upon the polymerization is not particularly limited. The polymerization may be performed under any one of increased pressure, normal pressure (atmospheric pressure), and reduced pressure.

Polymerization Facility

The water-soluble copolymer aqueous solution includes hydrogen peroxide as an essential component. Therefore, use of hydrogen peroxide as a initiator or a chain transfer agent contributes to simplification of production processes and reduction in production cost. In this time, however, the presence of a metal ion in the polymer system induces decomposition of the hydrogen peroxide. When the metal ion remains in the polymerization solution, decomposition of the hydrogen peroxide may proceed with time even if the hydrogen peroxide is added after the metal ion is added, whereby it is necessary to add extra hydrogen peroxide. Accordingly, the polymerization facility, in particular a polymerization furnace is preferably subjected to processing in such a manner that the metal ion does not elute. Specific examples of the material of the facility include SUS316 and a metal subjected to glass lining treatment such as a stainless steel subjected to glass lining treatment.

Concentration of Hydrogen Peroxide During Polymerization

The weight ratio of the hydrogen peroxide during the polymerization is preferably set to 10 ppm or more with respect to the solid content of the polymerization solution because color tone of the copolymer after drying is improved.

In a preferred production method for the water-soluble copolymer aqueous solution, the content of the hydrogen peroxide in the polymerization solution when dropping of all monomers and initiators to a reactor is terminated (at termination of the polymerization) is set to from about 10 ppm to about 50,000 ppm at weight ratio with respect to the solid content of the water-soluble copolymer aqueous solution. The method for determining the solid content of the water-soluble aqueous solution is provided hereinbelow among the provided Test Methods. Also, the water-soluble copolymer aqueous solution generally comprises from about 33% to 99% water. By producing the water-soluble copolymer aqueous solution as described above, the color tone of the copolymer after drying is improved. In addition, stability of viscosity of the water-soluble copolymer aqueous solution with time is improved.

When the production steps of the water-soluble copolymer includes the aging step as described below (step of continuing heating and incubation in a reactor (polymerization furnace) after the polymerization) or a neutralizing step, the content of the hydrogen peroxide at the time when the aging step or the neutralizing step is terminated (at the time the polymerization solution is removed from a reactor subjected to aging treatment or neutralizing treatment) is set to 10 ppm or more and 50,000 ppm or less with respect to a solid content of the polymerization solution (water-soluble copolymer aqueous solution). By producing the water-soluble copolymer aqueous solution as described above, the color tone of the copolymer after drying is improved. In addition, viscosity stability of the water-soluble copolymer aqueous solution with time is improved.

The content of the hydrogen peroxide after termination of the polymerization step or after termination of the aging step or termination of the neutralizing step is preferably 25 ppm or more and 20,000 ppm or less, more preferably 50 ppm or more and 10,000 ppm or less, and most preferably 100 ppm or more and 5,000 ppm or less at weight ratio with respect to the solid content of the polymerization solution (water-soluble copolymer aqueous solution). Note that it is preferred that the content of the hydrogen peroxide is adjusted in the above range at the time of the last step among the polymerization step, the aging step, and the neutralizing step.

Aging/Neutralizing Step

An aging step or a neutralizing step may be provided as required at the time when the polymerization is terminated. The aging step is preferably provided because the residual monomer amount can be reduced by the aging step. Because the amount of the hydrogen peroxide in the reaction liquid (polymerization liquid, polymerization solution) remarkably reduces during the aging step or the neutralizing step, addition amount and addition time are preferably provided so that the content of the hydrogen peroxide does not become 10 ppm or less with respect to the solid content of the polymerization solution. It is not preferred that the content of the hydrogen peroxide be 10 ppm or less with respect to the solid content of the polymerization solution during the aging step or the neutralizing step because the polymerization liquid is colored. In a preferred method, hydrogen peroxide is added during the aging step or the neutralizing step so that the content of the hydrogen peroxide is kept at 10 ppm or more and 50,000 ppm or less with respect to the content of the water-soluble copolymer.

In the aging step, the aging time is appropriately determined. That is, when the aging time is lengthened, the residual monomer amount can be reduced, and the rate at which the residual monomer amount is reduced with longer aging time, so production efficiency lowers. Accordingly, the aging time is determined by balance between acceptable residual monomer amount and production efficiency.

Composition of Water-Soluble Copolymer Aqueous Solution

The water-soluble copolymer aqueous solution includes hydrogen peroxide as an essential component. The water-soluble copolymer aqueous solution includes hydrogen peroxide, so the water-soluble copolymer aqueous solution is excellent in storage stability and, when the water-soluble copolymer aqueous solution is used as a detergent raw material, the detergent is prevented from being colored yellow.

The composition ratio (content) of the hydrogen peroxide in the water-soluble copolymer aqueous solution is 10 ppm to 50,000 ppm at weight ratio with respect to the solid content of the water-soluble copolymer aqueous solution. The phrase "at weight ratio" in the present invention means that the composition ratio of the hydrogen peroxide is represented by the following formula: composition ratio of hydrogen peroxide with respect to the solid content of water-soluble copolymer aqueous solution (%)=weight of hydrogen peroxide/weight of solid content of water-soluble copolymer aqueous solution×100; or similarly, composition ratio of hydrogen peroxide with respect to solid content of water-soluble copolymer aqueous solution (ppm)=weight of hydrogen peroxide/weight of solid content of water-soluble copolymer aqueous solution×100×10,000.

The weight of the solid content of the water-soluble copolymer aqueous solution herein includes weight of water-soluble copolymer, residual monomer, initiator residue, and the like. In the present invention, the solid content of the water-soluble copolymer aqueous solution is a value measured by the method in the section <Measurement of solid content (solid content concentration) of copolymer aqueous solution> described below. When the composition ratio of the hydrogen peroxide with respect to the solid content is less than 10 ppm (weight ratio), it becomes difficult to obtain an improving effect of the storage stability of the water-soluble copolymer aqueous solution. In addition, when the water-soluble copolymer aqueous solution is used as a detergent raw material, it becomes difficult to prevent the detergent from being colored yellow. On the other hand, when the composition ratio of the hydrogen peroxide with respect to the solid content exceeds 50,000 ppm (weight ratio), performance of a detergent tends to deteriorate when the water-soluble copolymer aqueous solution is blended in the detergent.

The composition ratio of the hydrogen peroxide with respect to the solid content of the water-soluble copolymer aqueous solution is preferably 25 ppm or more and 20,000 ppm or less, more preferably 50 ppm or more and 10,000 ppm or less, and most preferably 100 ppm or more and 5,000 ppm or less. When the composition ratio of the hydrogen peroxide with respect to the solid content of the water-soluble copolymer aqueous solution is within the above range, viscosity change of the water-soluble copolymer aqueous solution with time can also be suppressed.

The water-soluble copolymer aqueous solution includes water as an essential component. The water-soluble copolymer aqueous solution is characterized by including 33 to 99% of water based on the total weight of the water-soluble copolymer aqueous solution. The water concentration of less than 33% (weight ratio) is not preferred because viscosity of the water-soluble copolymer aqueous solution increases, resulting in difficult handling. The water concentration of 99% or more (weight ratio) is not preferred because cost upon transfer or storage increases.

In general, the residual monomer amount is preferably as small as possible. Specifically, the residual amount of the monoethylenic monocarboxylic acid (or monocarboxylate) is preferably 1,500 ppm or less, more preferably 1,000 ppm or less, and still more preferably 700 ppm or less with respect to the solid content of the water-soluble copolymer aqueous solution. The residual amount of the monoethylenic dicarboxylic acid (dicarboxylate) is preferably 15,000 ppm or less, more preferably 10,000 ppm or less, and still more preferably 7,000 ppm or less with respect to the solid content of the water-soluble copolymer aqueous solution. The residual amount of the monoethylenic unsaturated monomer having a sulfonic (or sulfonate) group is preferably 15,000 ppm or less, more preferably 10,000 or less, and still more preferably 7,000 ppm or less with respect to the solid content of the water-soluble copolymer aqueous solution.

Note that the water-soluble copolymer aqueous solution may be mixed with a compound insoluble to water before use.

In addition, poor color tone of the water-soluble copolymer aqueous solution is one of the factors which result in poor color tone of a powder containing the water-soluble copolymer aqueous solution. Accordingly, the color tone of the water-soluble copolymer aqueous solution is preferably good. Specifically, when the concentration of the water-soluble copolymer aqueous solution is adjusted to 45 weight %, b value is preferably 13 or less, more preferably 10 or less, and still more preferably 8 or less.

Powder Containing Water-Soluble Copolymer Aqueous Solution (Powder Composition)

The powder (powder composition) may be obtained by drying the water-soluble copolymer aqueous solution herein. The water-soluble copolymer aqueous solution contains hydrogen peroxide, resulting in a powder which has excellent color tone, and which prevents its "yellowing".

The powder has excellent color tone and calcium deposition-suppressing ability, to thereby be used preferably as a detergent additive or the like. When a 45 weight % aqueous solution is prepared by dissolving the powder in distilled water, the b value thereof is preferably 13 or less, more preferably 10 or less, and still more preferably 8 or less. The less the powder is colored when dissolved in distilled water, the less the dry powder is colored. If the b value exceeds 13 when the 45 weight % aqueous solution is prepared, the final product such as a detergent is colored to a large extent, whereby the blending amount of the powder must be equal to or less than a necessary amount.

The water-soluble copolymer aqueous solution of the present invention is generally dried under heating condition. When the aqueous solution is dried at normal pressure, the drying is performed preferably at 80 to 200° C. in view of drying efficiency. In addition, the drying is performed preferably at normal temperature or reduced pressure, and may be performed in an inert gas atmosphere such as nitrogen. The general drying means such as a drum drying or spray drying can be applied to the drying.

The powder of the present invention includes, as well as water-soluble copolymer, the residue of raw material for the copolymer such as the residual monomer, a by-product generated during the polymerization, and a by-product in which the by-product is modified in the drying process.

In addition, when it is difficult to obtain a powder-like product by drying the water-soluble copolymer aqueous solution alone due to characteristics of the water-soluble copolymer contained in the water-soluble copolymer aqueous solution, for example, characteristics of the monomer (d), the water-soluble copolymer aqueous solution can be dried in combination with an appropriate powder auxiliary. Examples of the appropriate powder auxiliary include inorganic compounds and polymers having high glass transition temperature.

In addition, the powder containing the water-soluble copolymer of the present invention may be produced by drying the water-soluble copolymer aqueous solution of the present invention in combination with another component required in the application in which the powder is used.

That is, the powder of the present invention may further include a powder auxiliary or another component required in the application in which the powder is used.

EXAMPLES

Test Methods

Weight-Average Molecular Weight
The weight-average molecular weight (Mw) refers to the value measured by means of GPC (gel permeation chromatography).
Measurement device: "Shodex SYSTEM-2" manufactured by Showa Denko K.K.
Column: It is prepared by connecting in series the "Asahipak GF-710 HQ" and "Ashipak GF-310 HQ" manufactured by Showa Denko K.K.
Eluting liquid: 0.1N sodium acetate/acetonitrile=7/3 (ratio by volume)
Flow rate: 0.5 mL/min
Temperature: 40° C.
Calibration line: It is prepared by using a standard sample of polyacrylic acid (product of Sowa Kagaku K.K.)
Detector: RI
Solids Content Measurement Method
The solids content of the reaction liquid containing copolymer after polymerization is computed by taking the nonvolatile content remaining after 1-h treatment of the reaction liquid by a hot-air drier at 170° C. as the solids content.

Example 1

ADW Powder

|  | A | B | C | D | E | F | G |
|---|---|---|---|---|---|---|---|
| Sodium tripolyphosphate | 0 | 6 | 10 | 0-20 | 0 | 0 | 0 |
| Silicate solids | 0-6 | 0-6 | 0-6 | 6-10 | 0-2.5 | 2.5-6 | 2.5-6 |
| Carbonate | 35 | 40 | 40 | 25-40 |  | 25-40 | 25-40 |
| Sodium Bicarbonate |  |  |  |  | 5-15 |  |  |

-continued

|  | A | B | C | D | E | F | G |
|---|---|---|---|---|---|---|---|
| Xanthan gum |  |  |  |  | 0.5-1.0 |  |  |
| MGDA |  |  |  |  | 4.0-7.5 | 4-7 | 2-4 |
| GLDA | 0-10 | 0-10 |  |  | 0-10 |  |  |
| HEDP |  |  |  |  |  | 0.05-0.3 | 0.05-0.3 |
| Nonionic surfactant[1] | 0 | 0 | 0 | 0.5-5 | 0.5-5 | 0.5-1.0 | 0.5-1.0 |
| Polymer dispersant[2] | 0.5 | 5 | 6 | 5 |  | 0.1-2.0 | 0.1-2.0 |
| Polymer dispersant[3] |  |  |  |  | 0.5-3.0 |  |  |
| Copolymer[4] | 0.05-10 | 1 | 2.5 | 5 | 6-8 | 4-6 | 2-3 |
| Enzymes | 0.3-0.8 | 0.3-0.8 | 0.3-0.8 | 0.3-0.8 | 0.1-1.0 | 0.25-0.6 | 0.25-0.6 |
| Bleach and bleach activators[5] | 4 | 4 | 4 | 4 | 0 | 1.0-5.0 | 2.0-4.0 |
| Disodium citrate dihydrate | 0 | 0 | 0 | .5-30 | 0 | 0 | 0 |
| Sodium Sulfate | 30-50 | 30-50 | 30-50 | 30-50 | 0 | 30-50 | 30-50 |
| Perfume | 0.01-0.1 | 0.01-0.1 | 0.01-0.1 | 0.01-0.1 | 0.01-0.1 | 0.01-0.1 | 0.01-0.1 |
| Water, dye and other adjuncts | Balance to 100% | Balance to 100% | Balance to 100% | Balance to 100% | Balance to 100% | Balance to 100% | Balance to 100% |

[1]Such as SLF-18 POLY TERGENT from the BASF Corporation.
[2]acrylic/maleic/HAPS copolymer, MW 8,300 or MW 13,000.
[3]ALCO 245, available from Alco.
[4]A copolymer or any mixture of copolymers according to any of Examples 1, 2, or 3.
[5]Cobalt SALEN, available from Aldrich.

Example 2

ADW Unit-Dose Products

| Example | A |
|---|---|
| Particulate composition |  |
| STPP | 0 |
| Silicate | 2-8 |
| Carbonate | 25-50 |
| MGDA | 10-25 |
| Copolymer[1] | 5-10 |
| Polymer Dispersant[2] | 1-5 |
| Nonionic Surfactant[3] | 1-5 |
| Enzyme | 1-6 |
| Bleach and Bleach Activators[4] | 2.5-10 |
| Perfume | 0.05-1 |
| Sodium Sulfate | 0-10 |
| Liquid composition |  |
| Di-Propylene Glycol | 40-50 |
| Nonionic Surfactant[3] | 40-50 |
| Neodol C11E9 | 0-5.0 |
| Glycerine | 0-5.0 |
| Dye | 0.1-1.0 |

[1]A copolymer or any mixture of copolymers according to any of Examples 1, 2, or 3.
[2]acrylic/maleic/HAPS copolymer, MW 8,300 or MW 13,000,.
[3]Such as SLF-18 POLY TERGENT from the BASF Corporation.
[4]Cobalt SALEN, available from Aldrich.

Example 3

ADW Gel Formulation

| Material name | Example 1 % solids or active % | Example 2 % solids or active % | Example 3 % solids or active % | Example 4 % solids or active % | Example 5 % solids or active % |
|---|---|---|---|---|---|
| GLDA | 15.0 | 8.5 | 15.0 | — | 30.0 |
| MGDA | — | — | — | 15.0 | — |
| Sulfonated polymer | 1.5 | 2.5 | 1.5 | 1.0 | 4.0 |
| Xanthan Gum | 0.5 | 0.5 | 0.5 | 0.5 | 0.6 |
| Quaternary amine, ethoxylated | — | — | 1.0 | 1.0 | 2.0 |
| Sodium benzoate | 0.2 | 0.2 | 0.2 | 0.2 | 0.2 |
| CaCl2•H2O | 0.33 | 0.33 | 0.33 | 0.33 | 0.33 |
| Sodium silicate | 1.8 | 1.8 | 1.8 | 2.0 | 2.0 |
| Citric Acid | 2.0 | 1.1 | 2.0 | 2.0 | 3.6 |
| Zinc sulfate | 0.60 | 0.60 | 0.60 | 0.60 | 0.60 |
| Sodium sulfate | 6.0 | 9.0 | 6.0 | 6.0 | — |
| Sodium bicarbonate | 6.0 | 6.0 | 6.0 | 6.0 | — |
| Plurafac SLF18 | 1.0 | 1.0 | 1.0 | 1.5 | 2.0 |
| Protease[1] | 0.50 | 0.50 | 0.5 | 0.5 | 1.0 |
| Amylase[2] | 0.11 | 0.11 | 0.11 | 0.11 | 0.20 |
| Perservatives | 0.005 | 0.005 | 0.005 | 0.005 | 0.005 |
| Dye | 0.004 | 0.004 | 0.004 | 0.004 | 0.004 |

-continued

| Material name | Example 1 % solids or active % | Example 2 % solids or active % | Example 3 % solids or active % | Example 4 % solids or active % | Example 5 % solids or active % |
|---|---|---|---|---|---|
| Perfume | 0.10 | 0.10 | 0.10 | 0.10 | 0.10 |
| DI water | Balance | Balance | Balance | Balance | Balance |

[1] Savinase Ultra L/XL ®, available from Novozymes ®
[2] Stainzyme Plus ®, available from Novozymes ®

All percentages and ratios are calculated by weight unless otherwise indicated. In the case of unit-dose ADW compositions, all percentages and ratios are based upon the total amount of solid or liquid composition respectively and do not include the weight of any packaging and/or film which may encapsulate the composition(s). All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

The dimensions and other values disclosed herein are not to be understood as being strictly limited to the exact numerical values recited. Instead, unless otherwise specified, each such value is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

INDUSTRIAL APPLICABILITY

The ADW composition of the present invention can be suitably used in a detergent composition.

The invention claimed is:

1. An ADW composition comprising a builder and a water-soluble copolymer which comprises:
   (a) from about 30 to 60 molar % of the copolymer comprising maleic acid;
   (b) from about 30 to 60 molar % of the copolymer comprising acrylic acid; and
   (c) from about 5 to 15 molar % of the polymer comprising 3-allyloxy-2-hydroxy-1-propanesulfonic acid; and
   wherein the water-soluble copolymer has a weight average molecular weight of from about 1,000 to about 50,000 and wherein said water-soluble polymer is polymerized with hydrogen peroxide.

2. An ADW composition according to claim 1, wherein the builder is selected from the group consisting of MGDA, GLDA, and mixtures thereof.

3. An ADW composition according to claim 2, further comprising from about 0.25% to about 4% by weight of the composition of a nonionic surfactant.

4. An ADW composition according to claim 3, wherein the copolymers comprise: (a) 45% maleic acid; (b) 45% acrylic acid; and (c) 10% 3-allyloxy-2-hydroxy-1-propanesulfonic acid and wherein the copolymer has a weight average molecular weight of from about 6,000 to about 8,300.

5. An ADW composition according to claim 4, further comprising from about 1 to about 10% by weight of the composition of a dispersant polymer, wherein the dispersant polymer comprises copolymers synthesized from acrylic acid, maleic acid, methacrylic acid, and combinations thereof.

6. An ADW composition comprising a builder and a water-soluble copolymer which comprises:
   (a) from about 30 to 60 molar % of the copolymer comprising maleic acid;
   (b) from about 30 to 60 molar % of the copolymer comprising acrylic acid; and
   (c) from about 5 to 15 molar % of the polymer comprising 3-allyloxy-2-hydroxy-1-propanesulfonic acid;
   wherein the water-soluble copolymer has a weight average molecular weight of from about 1,000 to about 50,000 and wherein said water-soluble polymer is polymerized with hydrogen peroxide, and wherein the ADW composition further comprises zinc salt.

* * * * *